United States Patent
Lian et al.

(10) Patent No.: US 9,329,031 B2
(45) Date of Patent: May 3, 2016

(54) TESTING DEVICE FOR TESTING DIMENSIONS OF WORKPIECES

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Hua-Jin Lian, New Taipei (TW); Liang Zhang, Shenzhen (CN); Zhen-Shan Cui, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/554,307

(22) Filed: Nov. 26, 2014

(65) Prior Publication Data

US 2015/0153159 A1 Jun. 4, 2015

(30) Foreign Application Priority Data

Nov. 30, 2013 (CN) .......................... 2013 1 0622205

(51) Int. Cl.
*G01B 11/02* (2006.01)
*G01B 11/30* (2006.01)

(52) U.S. Cl.
CPC .............. *G01B 11/306* (2013.01); *G01B 11/02* (2013.01)

(58) Field of Classification Search
CPC ...... G01B 11/026; G01B 11/02; G01B 11/16; G01B 11/306; G01B 11/043; G01B 11/046; G01B 11/30; G01N 21/57
USPC ......................................... 356/600, 614–636
See application file for complete search history.

(56) References Cited

U.S. PATENT DOCUMENTS

| | | | | |
|---|---|---|---|---|
| 5,726,366 A | * | 3/1998 | Washio | B23Q 17/20 356/635 |
| 7,430,050 B2 | * | 9/2008 | Kamiyama | G01B 11/2433 356/625 |
| 2003/0164954 A1 | * | 9/2003 | Gerhard | A43D 1/025 356/635 |
| 2007/0253004 A1 | * | 11/2007 | Danenberg | A43D 1/025 356/635 |

* cited by examiner

*Primary Examiner* — Hoa Pham
(74) *Attorney, Agent, or Firm* — Novak Druce Connolly Bove + Quigg LLP

(57) ABSTRACT

A testing device includes a positioning mechanism, a testing mechanism, and a controller. The testing device is used for testing lengths, widths, straightness, verticality, flatness, position of the testing points, and other dimensions of a workpiece. The positioning mechanism is used for positioning the workpiece. The testing mechanism is fixed on the positioning mechanism for testing dimensions of the workpiece at one time. The controller is electrically coupled to the testing mechanism for controlling the testing mechanism in use.

14 Claims, 2 Drawing Sheets

TESTING DEVICE FOR TESTING DIMENSIONS OF WORKPIECES

FIELD

The subject matter herein generally relates to a testing device for testing dimensions of a workpiece.

BACKGROUND

Lengths, widths, straightness, verticality, flatness, and other dimensions of a workpiece should be tested in manufacture.

BRIEF DESCRIPTION OF THE DRAWINGS

Implementations of the present technology will now be described, by way of example only, with reference to the attached figures.

DETAILED DESCRIPTION

Figure 1:
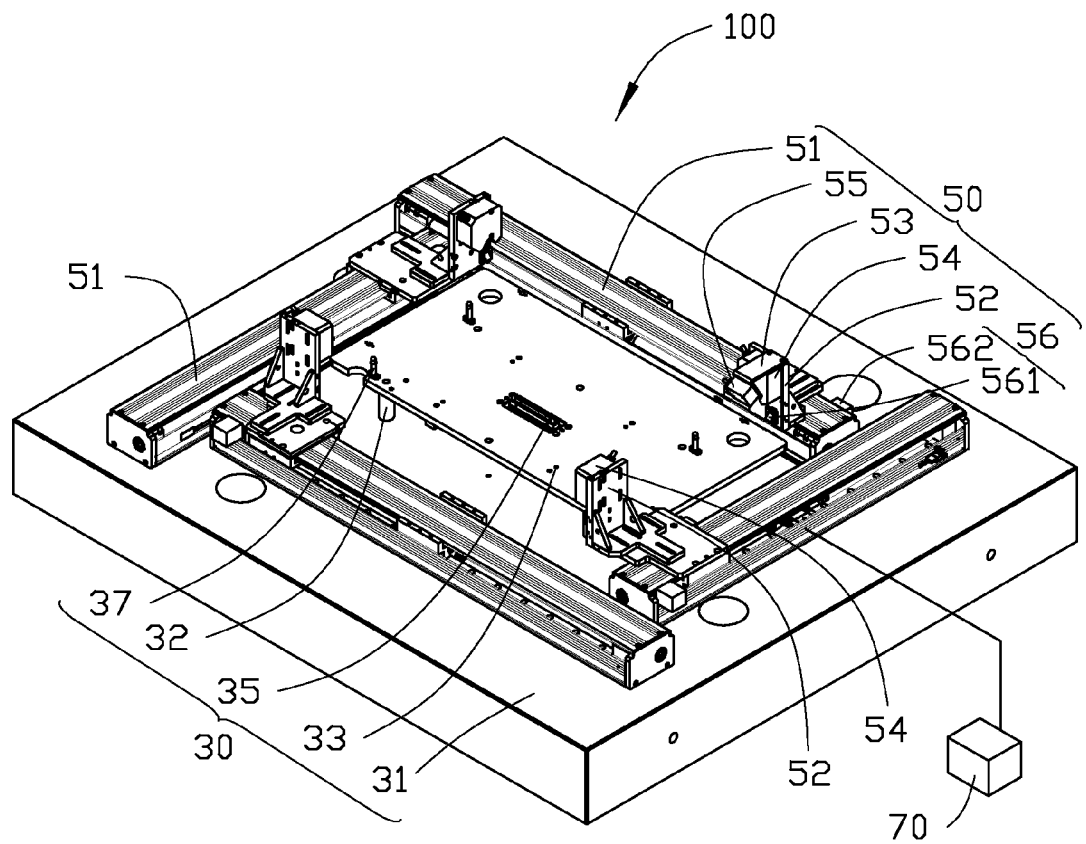
FIG. 1 illustrates an isometric view of a testing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A testing device can be configured for testing dimensions of a workpiece. The workpiece can include a plurality of sidewalls. The testing device can include a positioning mechanism, a testing mechanism, and a controller. The positioning mechanism can be configured for supporting and positioning the workpiece. The testing mechanism can be fixed on the positioning mechanism. The testing mechanism can include a plurality of driving members arranged on the positioning mechanism in sequence, a plurality of first mounting members, and a plurality of first testing members. Each driving member can be positioned adjacent to corresponding one sidewall of the workpiece in use. Each first mounting member can be mounted on respective one driving member. Each first testing member can be mounted on respective one first mounting member for obtaining dimensions of the workpiece. Each detecting assembly can include a signal sending member and a signal receiving member. The signal sending member can be positioned on respective one first mounting member. The signal receiving member can be positioned on the respective one driving member. The controller can be electrically coupled to the testing mechanism for controlling the testing mechanism.

Each driving member can be configured to drive the respective one first mounting member and the first testing member to slide. Each detecting assembly can detect testing position signal sent by the respective one first testing member and send back to the controller when the controller controls the plurality of driving members drive the plurality of first mounting members to move. The controller can control the plurality of first testing members to slide in a preset safe range according the testing positions of signal for avoiding collisions between the plurality of driving members. Each first testing member can obtain a corresponding dimensional data and transmits to the controller for analyzing and storage in a slide of each first testing member. The controller can determine the dimensions of the workpiece whether achieve as demanded according to a preset standard value of the controller.

FIG. 1 illustrates a testing device 100 including a positioning mechanism 30, a testing mechanism 50, and a controller 70. The testing device 100 can be used for testing lengths, widths, straightness, verticality, flatness, position of testing points, and other dimensions of a workpiece (not shown). In an illustrated embodiment, the workpiece can be a quadrilateral board and can define an opening in a substantial center portion of the workpiece. The workpiece can include four sidewalls. The workpiece can have a two dimensional code for distinguishing from other workpieces. The positioning mechanism 30 can be used for positioning the workpiece. The testing mechanism 50 can be fixed on the positioning mechanism 30 for testing dimensions of the workpiece at one time. The testing mechanism 50 can also read the two dimensional code of the workpiece for distinguishing the workpiece from other workpieces. The controller 70 can be electrically coupled to the testing mechanism 50 for controlling the testing mechanism 50 in use.

Figure 2:
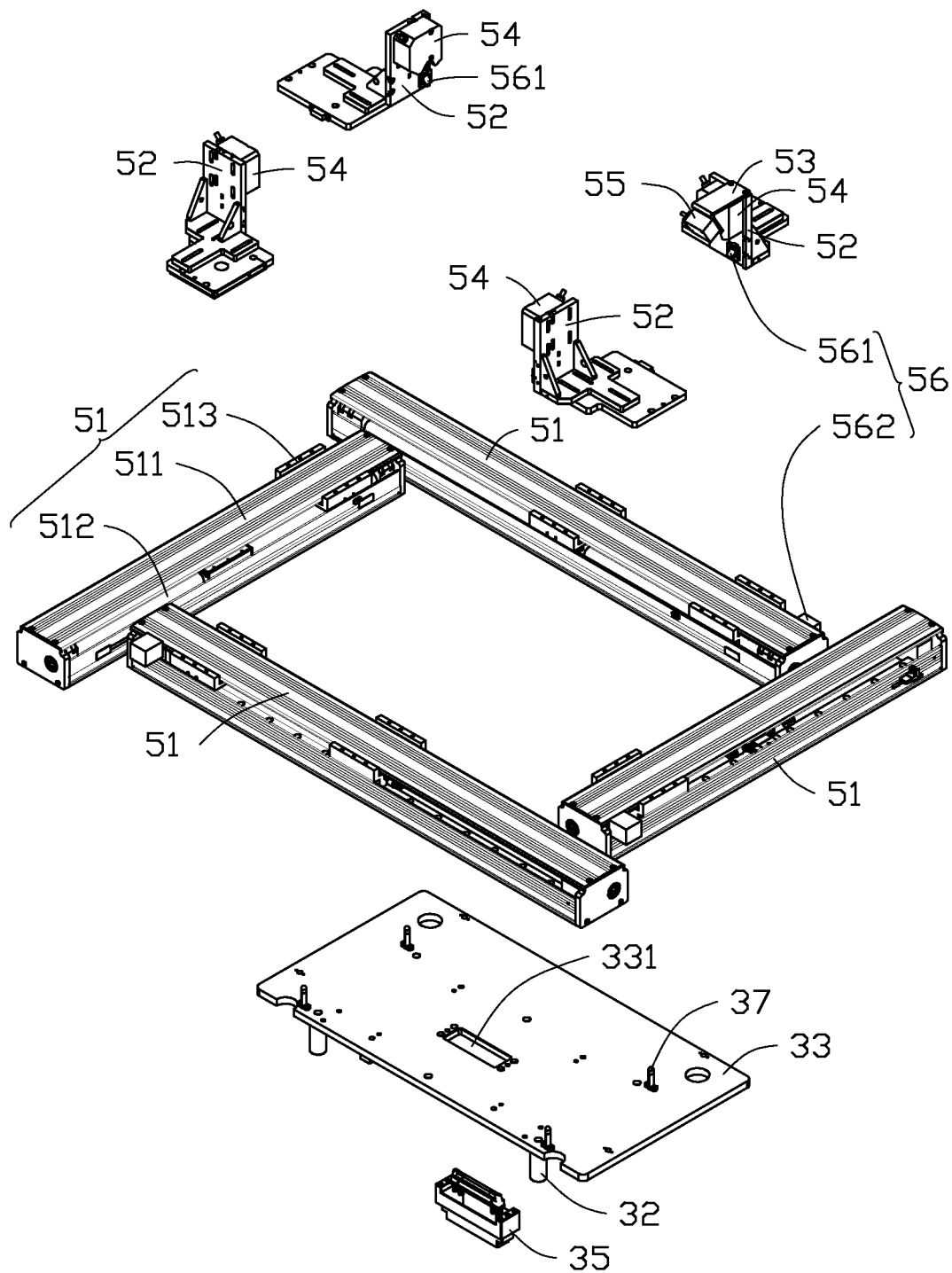
FIG. 2 is an exploded view of the testing device in FIG. 1.

Also referring to FIG. 2, the positioning mechanism 30 can include a base 31, a plurality of supporting rods 32, a fixing member 33, a positioning member 35, and four supporting members 37. Each of the plurality of supporting rods 32 can be perpendicularly coupled to the base 31 at one end. The fixing member 33 can be substantially in a board shape. The fixing member 33 can be fixedly supported by the plurality of supporting rods 32 away from the base 31. The fixing member 33 can define an through hole 331 for receiving the positioning member 35. An end of the positioning member 35 can be fixed on the fixing member 33 adjacent to the supporting rods 32. Another end of the positioning member 35 can pass through the through hole 331. Heights of the four supporting members 37 can be same. The four supporting members 37 can be separately fixed to one side surface of the fixing member 33 at one end and positioned away from the supporting rods 32. The four supporting members 37 can be positioned on four corners of a suppositional rectangle. Another end of each supporting member 37 can be used for supporting the workpiece. The workpiece can be positioned on the supporting members 37 away from the base 31, and the positioning member 35 can pass through the through hole 331 and extend into the opening of the workpiece for positioning the workpiece.

The testing mechanism 50 can include four driving members 51, four first mounting members 52, a second mounting member 53, four first testing members 54, a second testing member 55, and four detecting assemblies 56. The four driving members 51 can be arranged on the base 31 in sequence and positioned around the fixing member 33. Each first mounting member 52 can be mounted on respective one driving member 51. The second mounting member 53 can be formed on one end of one first mounting member 52 away from the respective one driving member 51 and face toward the positioning mechanism 30. Each of the four first testing members 54 can be mounted on respective one first mounting member 52 for obtaining dimensions of the workpiece. The second testing member 55 can be fixedly positioned on the second mounting member 53 for reading the two dimensional code of the workpiece. Each detecting assembly 56 can be coupled to respective one driving member 51 and respective one first mounting member 52 for detecting motions of respective one first testing member 54 and the second testing member 55.

Each driving member 51 can include a supporting portion 511, a driving body 512, and a sliding portion 513. Each supporting portion 511 can be positioned on the base 31 and positioned adjacent to respective one sidewall of the workpiece in use. Each adjacent two driving bodies 512 can be vertical to each other. The driving body 512 can be a screw rod and two end portions of the driving body 512 can be movably positioned on the supporting portion 511. The sliding portion 513 can be slidably sleeved on the driving body 512 and threaded with the driving body 512. The driving body 512 can be configured for moving the sliding portion 513 along an axis of the driving body 512. Each first mounting member 52 can be fixedly positioned on respective one sliding portion 513. Each first mounting member 52 can be in a substantially L-shaped board. The second mounting member 53 can be formed on one end of one first mounting member 52 away from the respective one sliding portion 513 and face the fixing member 33. In other embodiments, the driving members 51 can be other driving mechanisms, such as cylinders, motors.

Each first testing member 54 can be mounted on the respective one first mounting member 52 away from the respective one sliding portion 513 for obtaining the dimensions of the workpiece, such as lengths, widths, straightness, verticality, heights, position of testing points, recess depths, and flatness. The second testing member 55 can be fixedly positioned on the second mounting member 53 away from the respective one first mounting member 52 for obtaining a two dimensional code of the workpiece. The second testing member 55 can be inclined to the corresponding one first testing member 54. In the illustrated embodiment, the first testing member 54 can be laser displacement sensors, and the second testing member 55 can be a two-dimensional code reading device.

Each detecting assembly 56 can include a signal sending member 561 and a signal receiving member 562. The signal sending member 561 can be fixedly positioned on respective one first mounting member 52. The signal receiving member 562 can be fixedly positioned on respective one supporting portion 511. The signal sending member 561 can be used for sending signal. The signal receiving member 562 can be used for receiving the signal sent by the signal sending member 561 and transmitting the signal to the controller 70. The controller 70 can analyze and process the signal for controlling the first testing members 54 and the second testing member 55 to slide in a preset safe range. The controller 70 can stop motions of the first testing members 54 and the second testing member 55 when the first testing members 54 and the second testing member 55 slide out of the preset safe range, so as to avoid collisions between the sliding portions 513 and keep testing accuracy.

In assembly, the plurality of supporting rods 32 can be separately fixed on the base 31, and the fixing member 33 can be fixedly positioned on the plurality of supporting rods 32. The supporting members 37 can be separately fixed to the fixing member 33 at one end. The positioning member 35 can be positioned on the fixing member 33 and pass through the through hole 331. The four driving members 51 can be positioned on the base 31 around the fixing member 33. Each first mounting member 52 can be mounted on the respective one driving member 51. Each first testing member 54 can be mounted on the respective one first mounting member 52. The second mounting members 53 can be formed on one end of one first mounting member 52 away from the respective one driving member 51 and face toward the positioning mechanism 30. The second testing member 55 can be fixedly positioned on the second mounting member 53.

In use, a standard workpiece can be positioned on the support members 37, and the positioning member 35 can extend into an opening of the standard workpiece for positioning the workpiece. The driving member 51 can drive the first testing members 54 and the second testing member 55 to arrive at a first testing position. The first testing member 54 can send a first testing position signal to the standard workpiece and reflected by the standard workpiece. The first testing member 54 can receive and transmit the reflected first testing position signal to the controller 70. The controller 70 can analyze and process the first testing position signal, and then obtain the first testing position data of corresponding one dimensional of workpiece. The driving member 51 can drive the first testing members 54 and the second testing member 55 to arrive at a second testing position. The first testing member 54 can send a second testing position signal to the standard workpiece and reflected by the standard workpiece. The first testing member 54 can receive and transmit the reflected second testing position signal to the controller 70. Then, a preset standard value for one dimension of the standard workpiece can be obtained by the controller 70 via processing the first testing position data and the second testing position data. Other preset standard values for other dimensions of the standard workpiece can be obtained in similar steps. Testing positions can be chosen as more as possible for obtaining accurate standard dimensions of the standard workpiece.

The controller 70 can control each driving member 51 stop works when the first testing members 54 arrive at boundary of the preset safe range. The first testing member 54 and the second testing member 55 can be slide in the preset safe range for avoiding collisions between the sliding portions 513. The preset standard values for other being tested workpieces have been stored in the controller 70. The standard workpiece can be taken off after a testing process.

The workpiece waiting for being tested can be positioned on the testing device 100.

A position of the workpiece on the supporting rods 34 can be corresponding with a position of the standard workpiece on the testing device 100. The positioning member 35 can extend into the opening of the workpiece for positioning the workpiece. Dimensions of the workpiece can be tested in similar steps as described of testing the standard workpiece. In the illustrated embodiment, testing points of the workpiece can be set as same as the standard workpiece. The controller 70 can determine dimensions data of the workpiece whether achieve as demanded according to preset standard values stored in the controller 70. The workpiece can be a qualified product when the dimensions of the workpiece are in an allowed range of deviation. Otherwise, the workpiece can be a substandard product. The testing device 100 can obtain the dimensions of the workpiece at one time. The second testing member 55 can read the two dimensional code of the workpiece.

In other embodiments, the supporting rods 32 and the fixing member 33 can be omitted, and the supporting members 37 can be mounted on the base 31.

In other embodiments, the number of the supporting members 37 is not limited to four; it can be more than four. Four of supporting members 37 can be positioned on four corners of a suppositional rectangle, other of the supporting members 37 are separately mounted on the fixing member 33, and the supporting members 37 resist the workpiece.

In other embodiments, the second mounting member 53 and the second testing member 55 can be omitted, then the testing device 100 without a function of distinguishing workpieces.

In other embodiments, each adjacent two driving members 51 cannot be vertical to each other, and driving members 51 can just be positioned on the base 31 adjacent to the respective sidewall of the workpiece.

In other embodiments, the numbers of the driving members 51, the first mounting members 52, the first testing members 54, and the detecting assemblies 56 are not limited to four. The numbers of the driving members 51, the first mounting members 52, the first testing members 54, and the detecting assemblies 56 can correspond to the number of sidewalls of the workpiece. For example, the workpiece can be a triangular board, the numbers of the driving members 51, the first mounting members 52, the first testing members 54, and the detecting assemblies 56 are three.

The embodiments shown and described above are only examples. Many details are often found in the art such as the other features of a detecting assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A testing device configured for testing dimensions of a workpiece, the workpiece comprising a plurality of sidewalls, the testing device comprising:
    a positioning mechanism configured for supporting and positioning the workpiece;
    a testing mechanism fixed on the positioning mechanism, the testing mechanism comprising:
        a plurality of driving members arranged on the positioning mechanism in sequence, each driving member of the plurality of driving members being positioned adjacent to a corresponding sidewall of the workpiece;
        a plurality of first mounting members, each first mounting member mounted on respective one driving member of the plurality of driving members;
        a second mounting member formed on one end of one first mounting member away from the respective driving member and facing the positioning mechanism;
        a plurality of first testing members, each first testing member mounted on respective one first mounting member of the plurality of first mounting members configured for obtaining dimensions of the workpiece;
        a second testing member fixedly positioned on the second mounting member for obtaining a two dimensional code of the workpiece;
        a plurality of detecting assemblies, each detecting assembly of the plurality of detecting assemblies comprising a signal sending member and a signal receiving member, the signal sending member positioned on respective one first mounting member of the plurality of first mounting members, the signal receiving member positioned on the respective one driving member of the plurality of driving members; and
    a controller electrically coupled to the testing mechanism configured for controlling the testing mechanism and configured to control the plurality of first testing members slide in a preset safe range according to the testing positions of signal for avoiding collisions between the plurality of driving members,
    wherein each driving member is configured to drive the respective one first mounting member and the first testing member to slide, each detecting assembly detects testing position signal sent by the respective one first testing member and sends back to the controller when the controller controls the plurality of driving members to drive the plurality of first mounting members, and
    wherein each first testing member obtains a corresponding dimensional data and transmits to the controller for analyzing and storage in a slide of each first testing member, whereby the controller determines whether the dimensions of the workpiece are according to a preset standard value of the controller.

2. The testing device of claim 1, wherein each driving member comprises a supporting portion, a driving body, and a sliding portion, the supporting portion is positioned on the positioning mechanism, the driving body is a screw rod and two end portions of the driving body are movably positioned on the supporting portion, the sliding portion is threaded with the driving body, each first mounting member is fixedly positioned on respective one sliding portion, the driving body is configured for moving the sliding portion and the respective one first testing member.

3. The testing device of claim 1, wherein the positioning mechanism comprises a base, a positioning member, and a plurality of supporting members, positioning member is perpendicularly fixedly coupled to the base at one end and another one end of the positioning member is configured for extending into an opening of the workpiece for positioning, the plurality of supporting members is separately fixed to the base at one end.

4. The testing device of claim 3, wherein the positioning mechanism further comprises a plurality of supporting rods and a fixing member, each of the plurality of supporting rods is perpendicularly coupled to the base, the fixing member is fixedly supported by the plurality of supporting rods away from the base, the fixing member defines an through hole for letting the positioning member pass through, and an end of the positioning member is fixed on the fixing member adjacent to the base.

5. The testing device of claim 4, wherein heights of the plurality of supporting rods are same.

6. The testing device of claim 4, wherein the numbers of the first mounting members, the driving members, the first testing member, and the detecting assemblies are four, the testing device is configured for testing a quadrilateral workpiece.

7. The testing device of claim 1, wherein the plurality of first testing members are laser displacement sensors.

8. A testing device comprising:
a positioning mechanism;
a testing mechanism fixed on the positioning mechanism, the testing mechanism comprising:
a plurality of driving members arranged on the positioning mechanism in sequence, each driving member of the plurality of driving members being positioned adjacent to corresponding one sidewall of the workpiece in use;
a plurality of first mounting members, each first mounting member mounted on respective one driving member of the plurality of driving members;
a second mounting member formed on one end of one first mounting member away from the respective one driving member and facing the positioning mechanism;
a plurality of first testing members, each first testing member mounted on respective one first mounting member of the plurality of first mounting members and configured for obtaining dimensions of the workpiece;
a second testing member fixedly positioned on the second mounting member for obtaining a two dimensional code of the workpiece;
a plurality of detecting assemblies positioned on the testing mechanism, and configured for detecting testing position signal sent from the plurality of first testing members; and
a controller electrically coupled to the testing mechanism configured for controlling the testing mechanism,
wherein each driving member is configured to drive the respective one first mounting member and the first testing member to slide, each detecting assembly detects testing positions signals sent by the respective one first testing member and sends back to the controller, and
whereby each driving member drives the first mounting member to move, the controller analyzes and stores the testing positions signals, the controller determines the dimensions of the workpiece whether achieve as demanded according to preset standard values of the controller.

9. The testing device of claim 8, wherein each driving member comprises a supporting portion, a driving body, and a sliding portion, the supporting portion is positioned on the positioning mechanism, the driving body is a screw rod and two end portions of the driving body are movably positioned on the supporting portion, the sliding portion is threaded with the driving body, each first mounting member is fixedly positioned on respective one sliding portion, the driving body is configured for moving the sliding portion and the respective one first testing member.

10. The testing device of claim 8, wherein the positioning mechanism comprises a base, a positioning member, and a plurality of supporting members, positioning member is perpendicularly fixedly coupled to the base at one end and another one end of the positioning member is configured for extending into an opening of the workpiece for positioning, the plurality of supporting members is separately fixed to the base at one end.

11. The testing device of claim 10, wherein the positioning mechanism further comprises a plurality of supporting rods and a fixing member, each of the plurality of supporting rods is perpendicularly coupled to the base, the fixing member is fixedly supported by the plurality of supporting rods away from the base, the fixing member defines an through hole for letting the positioning member pass through, and an end of the positioning member is fixed on the fixing member adjacent to the base.

12. The testing device of claim 11, wherein heights of the plurality of supporting rods are same.

13. The testing device of claim 12, wherein the numbers of the first mounting members, the driving members, the first testing member, and the detecting assemblies are four, the testing device is configured for testing a quadrilateral workpiece.

14. The testing device of claim 8, wherein the plurality of first testing members are laser displacement sensors.

* * * * *